(12) United States Patent
Ahn

(10) Patent No.: US 8,424,163 B2
(45) Date of Patent: Apr. 23, 2013

(54) SNAP HINGE DEVICE FOR FOLDING-TYPE PORTABLE TERMINAL

(75) Inventor: Sung-Ho Ahn, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 13/212,505

(22) Filed: Aug. 18, 2011

(65) Prior Publication Data

US 2012/0084943 A1    Apr. 12, 2012

(30) Foreign Application Priority Data

Oct. 11, 2010  (KR) .................. 10-2010-0098998

(51) Int. Cl.
*E05D 11/10* (2006.01)

(52) U.S. Cl.
USPC .............................................. 16/330; 16/303

(58) Field of Classification Search ............. 16/330, 16/303, 250, 334, 324, 326, 327, 328, 329, 16/331, 332, 341, 352, 353
See application file for complete search history.

(56) References Cited

U.S. PATENT DOCUMENTS

| | | | | |
|---|---|---|---|---|
| 6,125,507 A * | 10/2000 | Katoh | | 16/329 |
| 6,832,411 B2 * | 12/2004 | Koshikawa et al. | | 16/330 |
| 6,886,221 B2 * | 5/2005 | Minami et al. | | 16/324 |
| 6,990,711 B2 * | 1/2006 | Koshikawa et al. | | 16/334 |
| 7,006,853 B2 * | 2/2006 | Kang et al. | | 455/575.3 |
| 7,100,244 B2 * | 9/2006 | Qin et al. | | 16/330 |
| 7,107,648 B1 * | 9/2006 | Lu et al. | | 16/330 |
| 7,117,563 B2 * | 10/2006 | Chen et al. | | 16/330 |
| 7,151,226 B2 * | 12/2006 | Minami et al. | | 174/161 R |
| 7,168,134 B2 * | 1/2007 | Minami et al. | | 16/303 |
| 7,251,859 B2 * | 8/2007 | Oshima et al. | | 16/330 |
| 7,552,512 B2 * | 6/2009 | Duan et al. | | 16/330 |
| 7,565,717 B2 * | 7/2009 | Duan et al. | | 16/303 |
| 7,578,030 B2 * | 8/2009 | Duan et al. | | 16/330 |
| 7,694,390 B2 * | 4/2010 | Luo | | 16/303 |
| 7,836,550 B2 * | 11/2010 | Lin | | 16/303 |
| 7,913,358 B2 * | 3/2011 | Guo et al. | | 16/330 |
| 7,913,360 B2 * | 3/2011 | Shen | | 16/340 |
| 7,929,285 B2 * | 4/2011 | Shen | | 361/679.21 |
| 7,971,318 B2 * | 7/2011 | Kim et al. | | 16/330 |
| 8,006,346 B2 * | 8/2011 | Zhang et al. | | 16/303 |
| 8,051,537 B2 * | 11/2011 | Wang et al. | | 16/330 |
| 8,056,186 B2 * | 11/2011 | Zhang et al. | | 16/303 |
| 8,056,187 B2 * | 11/2011 | Wang et al. | | 16/303 |

(Continued)

FOREIGN PATENT DOCUMENTS

| JP | 2003-101254 | 4/2003 |
|---|---|---|
| JP | 2003-194041 | 7/2003 |

(Continued)

*Primary Examiner* — Victor Batson
*Assistant Examiner* — Jason W San
(74) *Attorney, Agent, or Firm* — Cha & Reiter, LLC

(57) ABSTRACT

A snap hinge device for a folding-type portable terminal is provided with a gap between an outer face of a hinge shaft and an inner face of a second cam so that the outer face of the hinge shaft and the inner face of the second cam are compelled to strike into each other an generate and aural snap by an urging of an elastic member at the time of opening/closing the folder of the portable terminal. As a result of the aural snap, users experience a feeling of use at the time of opening/closing the folder, and a sense of comfort therefrom.

3 Claims, 3 Drawing Sheets

U.S. PATENT DOCUMENTS

| | | | | |
|---|---|---|---|---|
| 8,079,115 | B2* | 12/2011 | Zhang et al. | 16/326 |
| 8,099,831 | B2* | 1/2012 | Lee | 16/303 |
| 8,099,833 | B2* | 1/2012 | Duan et al. | 16/337 |
| 8,117,718 | B2* | 2/2012 | Chien | 16/330 |
| 8,196,262 | B2* | 6/2012 | Chang | 16/337 |
| 8,199,465 | B2* | 6/2012 | Shen | 361/679.01 |
| 8,240,007 | B2* | 8/2012 | Duan et al. | 16/330 |
| 8,244,318 | B2* | 8/2012 | Kim et al. | 455/575.3 |
| 2006/0112517 | A1* | 6/2006 | Luo et al. | 16/330 |
| 2007/0094843 | A1* | 5/2007 | Yang | 16/330 |
| 2007/0294859 | A1* | 12/2007 | Hsu et al. | 16/330 |
| 2009/0007378 | A1* | 1/2009 | Guo et al. | 16/286 |
| 2009/0300881 | A1* | 12/2009 | Lin | 16/303 |
| 2011/0157787 | A1* | 6/2011 | Duan et al. | 361/679.01 |
| 2011/0239404 | A1* | 10/2011 | Duan et al. | 16/250 |
| 2011/0252602 | A1* | 10/2011 | Huang et al. | 16/303 |
| 2011/0286160 | A1* | 11/2011 | Duan et al. | 361/679.01 |

FOREIGN PATENT DOCUMENTS

| | | |
|---|---|---|
| JP | 3686845 | 6/2005 |
| JP | 3764092 | 4/2006 |
| JP | 3825627 | 7/2006 |
| JP | 4021175 | 12/2007 |
| JP | 4141651 | 6/2008 |
| JP | 4175493 | 8/2008 |
| JP | 2008-248985 | 10/2008 |
| JP | 4212984 | 1/2009 |
| JP | 2009-043001 | 2/2009 |
| JP | 2009-197908 | 9/2009 |
| JP | 2010-060123 | 3/2010 |
| JP | 4473306 | 3/2010 |
| KR | 10-0403117 | 10/2003 |
| KR | 2003-078229 | 10/2003 |
| KR | 2003-078230 | 10/2003 |
| KR | 2003-083426 | 10/2003 |
| KR | 2003-085160 | 11/2003 |
| KR | 10-0487963 | 4/2005 |
| KR | 2005-031312 | 4/2005 |
| KR | 10-0605046 | 7/2006 |
| KR | 2006-088361 | 8/2006 |
| KR | 10-0665709 | 12/2006 |
| KR | 10-0672467 | 1/2007 |
| KR | 10-0706129 | 4/2007 |

\* cited by examiner

SNAP HINGE DEVICE FOR FOLDING-TYPE PORTABLE TERMINAL

CLAIM OF PRIORITY

This US Patent application claims priority under 35 U.S.C. §119 from a Korean Patent application entitled "Snap Hinge Device For Folding-Type Portable Terminal," filed in the Korean Intellectual Property Office on Oct. 11, 2010, and assigned Serial No. 10-2010-0098998, the contents of which are incorporated by reference herein.

BACKGROUND OF THE INVENTION

1. Field of the Invention

The present invention relates to a portable terminal, and more particularly to a snap hinge device for a folding-type portable terminal.

2. Description of the Related Art

In general and as used herein, the term, portable terminal, covers all kinds of portable electronic devices, such as cellular phones, smart phones, PDAs, notebook PCs, web boards, electronic books, etc. Portable terminals that enable mobile communication may be classified as bar-types, folding-types, sliding-types or the like in accordance with their entire external appearance.

Among the above-mentioned various types of portable terminals, a folding-type portable terminal includes a body, a folder, and a hinge device for rotatably interconnecting the body and the folder. A person with an ordinary skill in the art may easily appreciate such a basic construction for a folding-type portable terminal.

A hinge device employed in a folding-type portable terminal provides a semi-automatic folder opening/closing force at the time of the opening/closing action of the folder. That is, during the opening action of the folder, the hinge device provides a force for urging the folder to be closed toward the body until the folder is opened to a predetermined level of angle (approximately 30 to 45 degrees) from zero degrees. As the folder is opened beyond this predetermined level to another level of angle (approximately 120 to 170 degrees), the hinge device provides a force for urging the folder to be opened away from the body, wherein the hinge typically provides an anchoring force when the folder is fully opened. The semi-automatic folder opening/closing force is provided in consideration of a user's convenience in the opening/closing action of the folder.

Such a hinge device, which provides a semi-automatic folder opening/closing force, basically includes a housing, a shaft, an elastic member, and a cam unit. A person with an ordinary skill in the art may easily appreciate such a basic construction of a hinge device.

Although such a hinge device with semi-automatic folder opening/closing force is convenient, the hinge device has a disadvantage that it cannot provide a feeling of use for stimulating the user's physical senses while the user opens or closes the folder. The phrase "feeling of use" as used herein in relation to an opening/closing of a folder is meant to describe a folding condition recognizable by the user's senses, i.e., aurally, visually or tactually.

SUMMARY OF THE INVENTION

The present invention provides a hinge device for use in portable terminals that overcomes the above-mentioned problems occurring in the prior art.

The present invention provides a hinge device employed in a folding-type portable device that provides a feeling of use for stimulating the user's physical senses at the time of opening/closing a folder of a folding-type portable device.

Where the above-mentioned feeling of use in opening/closing a folder is to be aural, a sound should be produced at the time of opening/closing the folder. Likewise, if the feeling of use is to be visual, the opening/closing action should produce a light detectable by the eye using a light emission means or the like. If the feeling of use is to be tactual, a force detectable by a user's sense of touch should be provided by a motor or the like force generating device.

An aspect of the present invention provides a snap hinge device for a folding-type portable device which informs a user of the opening/closing action of a folder by an aural snap.

Another aspect of the present invention provides a snap hinge device for a folding-type portable terminal which aurally informs a user of the opening/closing action by using a gap between a hinge shaft and a second cam. That is, a snap hinge device for a folding-type portable terminal includes a gap g2 formed between an outer face of the hinge shaft and an inner face of the second cam such that the outer face of the hinge shaft and the inner face of the second cam strike into each other at the time of opening/closing the folder, thereby providing a snap.

Preferably, one end of the hinge shaft is formed with top and bottom rectangular flat faces, and the second cam is fitted on the top and bottom flat faces, wherein the gap g2 is formed between the top and bottom flat faces and the inner face of the second cam. Most preferably, another gap g1 is formed between the outer face of the second cam and the inner face of the cam cover, where the gap g2 is smaller than the other gap g1 so that an aural snap is provided by the gap g2 at the time of opening/closing the folder.

BRIEF DESCRIPTION OF THE DRAWINGS

The above aspects, features and advantages of the present invention will be more apparent from the following detailed description taken in conjunction with the accompanying drawings, in which.

DETAILED DESCRIPTION OF THE INVENTION

Figure 1:
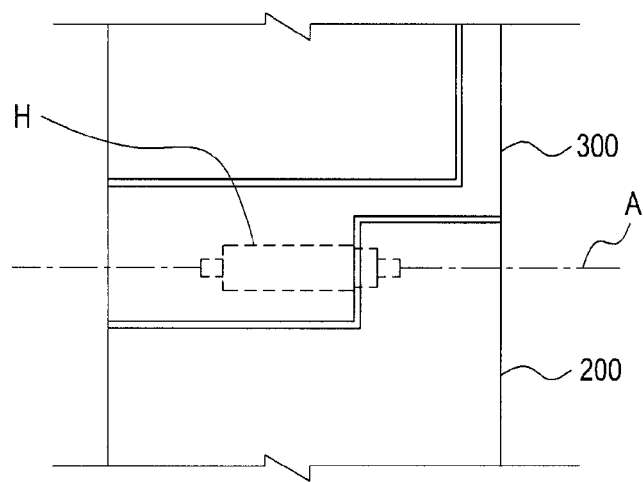
FIG. 1 is a schematic view of an inventive snap hinge device employed in a folding-type portable terminal according to the invention.

Hereinafter, embodiments of the present invention will be described with reference to the accompanying drawings. In the following description, the same elements will be designated by the same reference numerals although they are shown in different drawings.

As shown in FIG. 1, the inventive snap hinge device H may be employed in a folding-type portable terminal. As used herein, "snap hinge device H" is representative of a hinge device which can aurally inform a user of its acting condition at the time of a folding action. In particular, the inventive snap hinge device H produces an aural snap in a free stop type hinge device.

The folding-type portable terminal includes a body 200, a folder 300, and the snap hinge device H for rotatably connecting the folder 300 to the body 200. The snap hinge device H interconnects a side hinge arm of the body 200 and a center hinge arm of the folder 300, thereby providing a hinge axis A during the folding action of the folder 300.

Figure 2:
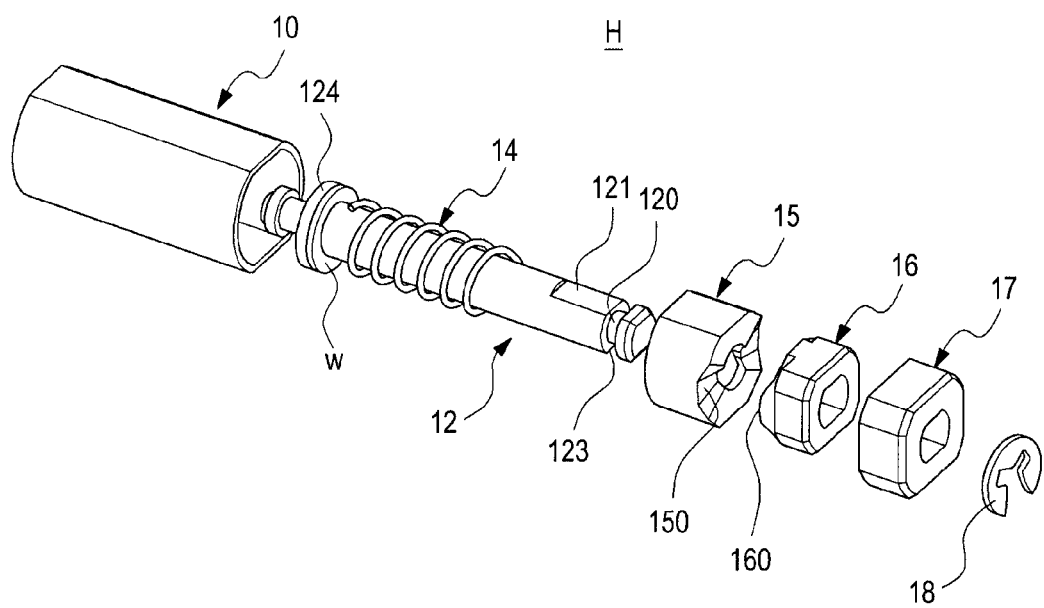
FIG. 2 is an exploded perspective view of the inventive snap hinge device.

The construction of the inventive snap hinge device H will be described in greater detail with reference to FIGS. 2 to 4. As shown therein, snap hinge device H includes a hinge housing 10, a hinge shaft 12, an elastic member 14, a cam unit comprising a first cam 15 and a second cam 16, a cam cover 17 and an anchoring member 18. Hinge device H provides a gap g2 between the hinge shaft 12 and the second cam 16 in order to generate an aural snap perceptible to a user due to the cam movement. In addition, the snap hinge device H provides a part of the folder opening/closing force at the time of the folding action of the portable terminal with the help of the cam movement of the cam unit (cams 15 and 16).

The hinge housing 10 is an elongated case in which the hinge shaft 12, the elastic member 14 and the cam unit 15 and 16 are received and arranged along the hinge axis A. One end of the hinge housing 10 is opened, and the other end is completely opened. Cam cover 17 is coupled to and closes the other end of the hinge housing.

The hinge shaft 12 is inserted into the center of the hinge housing 10 and extends in the longitudinal direction of hinge axis A. The hinge shaft 12 has a catch ridge 124 at one end, with a washer (w) and a catch groove 120 at the other end. The catch ridge 124 has a diameter that is larger than the diameter of the hinge shaft 12 and is fastened to the outer surface of an end of the hinge housing 10. A hinge or catch groove 120 is formed with a diameter that is smaller than the diameter of the hinge shaft 10. The hinge groove acts as a recess. An E-ring 18 is anchored to the hinge or catch groove 120. The hinge shaft 12 is installed through the elastic member 14 to guide the compression or tension movement of the elastic member 14. The hinge shaft 12 serves as an axis of the entire hinge device H. In addition, the hinge shaft 12 is D-cut on the face of the other end to provide top and bottom flat faces 121 and 123. The second cam 16 is arranged on the top and bottom flat faces 121 and 123, which will be described later.

The elastic member 14 is preferably a compression coil spring arranged along the hinge axis A within the hinge housing 10. When compressed or tensioned along the hinge shaft 12, the elastic member 14 urges the cam unit (first cam 15 and second cam 16) to come into close contact with each other. One end of the elastic member 14 is supported by an inner surface of one end of the hinge housing 10. The other end of the elastic member is retained in a close contact state with the cam unit (first cam 15 and second cam 16). In addition, the elastic force of the elastic member 14 is converted in terms of power transmission by the cam action of the cam unit (first cam 15 and second cam 16) as folder opening/closing force.

The first cam 15 of the cam unit is slid along the hinge shaft 12 within the hinge housing 10 and the second cam 16 is rotated in accordance with the rotation of the folder. One side of the first cam 15 is in close contact with the other end of the elastic member 14. The other side of the first cam is formed with a recess, thereby providing a recess-shaped cam face 150. One side of the second cam 16 is formed with a ridge thereby providing another cam face 160 (ridge-shaped cam face 160) to conduct cam action while being always retained in a close contact state with the recess shaped cam face 150. The other side of the second cam 16 is tightly coupled to the cam cover 17. At the time of the folding action of the folder, the first cam 15 is rectilinearly slid along the hinge axis and the second cam 16 is rotated about the hinge axis. Concurrently, the cam faces of the first and second cams 15 and 16 are slid against one another. Cam action is therefore conducted between the recess-shaped cam face 150 and the ridge-shaped cam face 160. If the ridge-shaped cam face 160 is received in the recess-shaped cam face 150, folder movement is stopped. If the ridge-shaped cam face 160 is in the process of either engaging or disengaging from the recess-shaped cam face 150, force is being supplied while the folder is being opened or closed.

The cam cover 17 is engaged with the second cam 16 to close the other side of the hinge housing 10. Finally, the cam cover 17 is coupled to the hinge housing 10 by the E-ring 18 to close the hinge housing 10.

Figure 4:
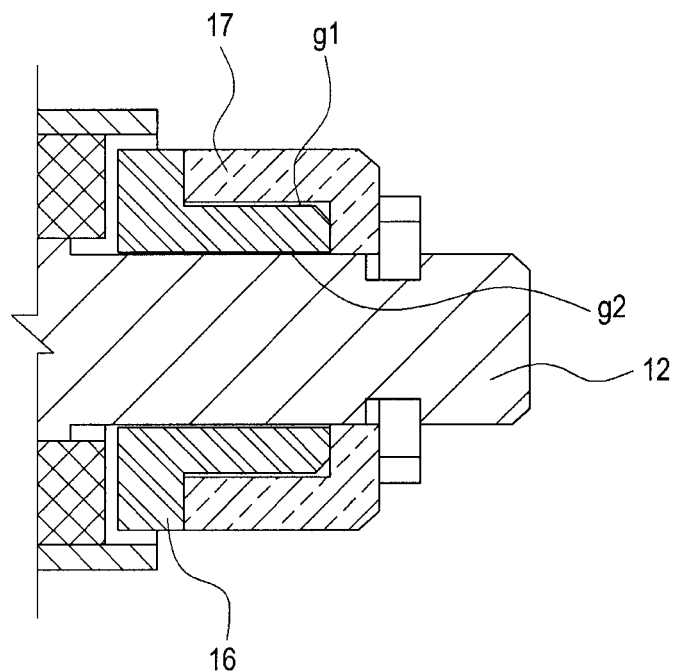
FIG. 4 is an enlarged view of a portion of the snap hinge device of FIG. 3.
Figure 5:
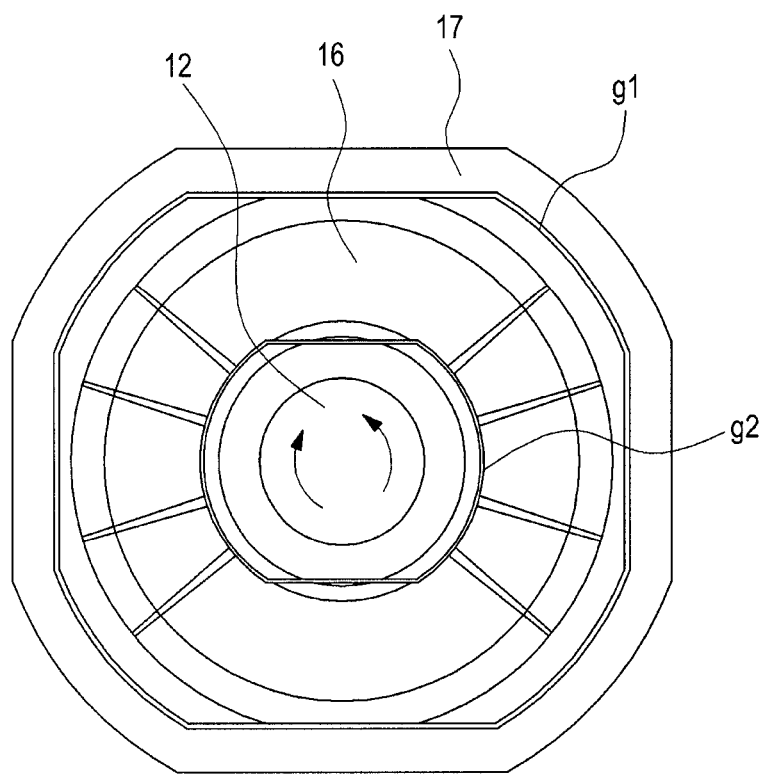
FIG. 5 is a side view showing a gap condition of the inventive snap hinge device.

As shown in FIGS. 4 and 5, two gaps are included to provide an aural snap at the time of opening/closing the folder. A first gap g1 is formed between the cam cover 17 and the second cam 16, and a second gap g2 is formed between the hinge shaft 12 and the second cam 16. Specifically, an inner face of the cam cover 17 and an outer face of the second cam 16 are faced to and spaced from each other and an outer face of the hinge shaft 12 and an inner face of the second cam 16 are faced to and spaced from each other.

Figure 3:
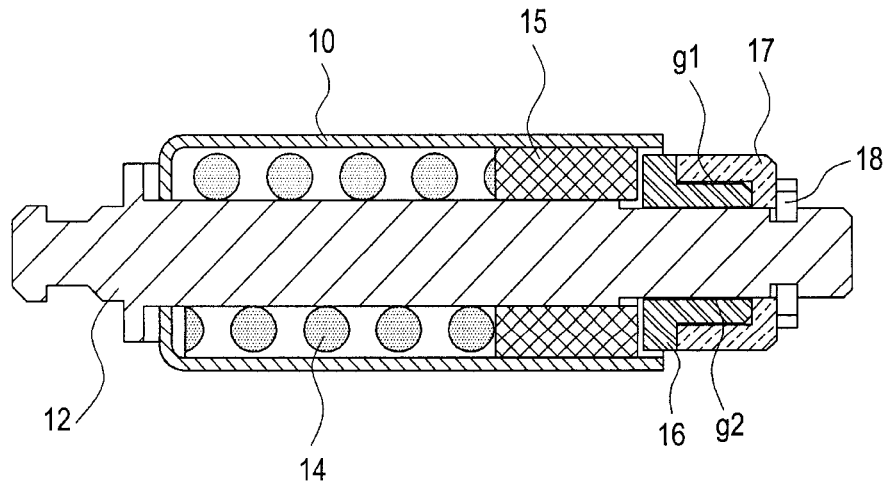
FIG. 3 is a cross-sectional view showing the inventive snap hinge device in an assembled state.

As described above, the other end portion of the hinge shaft 12 is D-cut with a predetermined length to form top and bottom flat faces 121 and 123, wherein the second cam 16 is fitted on the top and bottom flat faces 121 and 123 (see FIGS. 3 and 4). In this context, the inner face of the second cam 16 also is provided with top and bottom flat faces. Consequently, a predetermined gap is maintained between the top and bottom flat faces 121 and 123 of the hinge shaft and the top and bottom flat faces formed on the inner face of the second cam 16.

Preferably, by forming the second gap g2 to be smaller than the first gap g1, an audible sound is generated by the second gap g2 at the time of opening/closing the folder.

That is, at the time of opening/closing the folder, if the hinge shaft 12 is rotated counterclockwise, the outer face of the one side of the hinge shaft 12 (a corner part) first comes into contact with the inner face (a corner part) of the second cam 16. This counterclockwise rotational force thereby rotates the second cam 16 since the second gap g2 is smaller than the first gap g1. Concurrently, the recess-shaped cam face 150 on the first cam 15 is slid along the ridge-shaped cam face 160 on the second cam 16 and escapes (i.e., disengages) from the ridge-shaped cam face 160.

If the hinge shaft 12 is continuously rotated, the first cam 15 is retracted and the ridge-shaped cam face 160 on the second cam 16 comes into close contact with a protrusion formed in the recess-shaped cam face 150. Then, if the hinge shaft 12 is continuously rotated in the same direction, the ridge-shaped cam face 160 is rapidly lowered along the recess-shaped cam face 150, thereby producing a sound. That is, the sound is generated as the outer face of the hinge shaft 12 and the inner face of the second cam 16 strike into each other while the ridge-shaped cam face 160 is being rapidly lowered to the recess-shaped cam face 150, i.e., an aural snap is generated.

The fact that the second gap g2 is smaller than the first gap g1 is the feature enabling sound to be produced at the time of opening/closing the folder. That is, since the second gap g2 between the outer face of the hinge shaft 12 and the inner face of the second cam 16 is relatively smaller than the first gap g1, the sound produced at the time of cam action by the second gap g2 provides an aural snap.

While the invention has been shown and described with reference to certain embodiments thereof, it will be understood by those skilled in the art that various changes in form and details may be made therein without departing from the spirit and scope of the invention as defined by the appended claims.

What is claimed is:

1. A snap hinge device for a folding-type portable terminal having a body and a folder that is opened or closed in relation to the body, the snap hinge device comprising:
   a hinge housing;
   a hinge shaft;
   an elastic member provided on the hinge shaft;
   a cam unit including first and second cams which are faced to each other, wherein the elastic member provides a force urging the first and second cams to come into close contact with each other by the elastic member thereby conducting cam action; and
   a cam cover coupled to the hinge housing to shield the cam unit from the outside of the hinge housing,
   wherein a first gap (g2) is formed between at least one flat surface of an outer face of the hinge shaft and an inner face of the second cam such that the force provided by the elastic member compels said at least one flat surface of the outer face of the hinge shaft and the inner face of the second cam to strike into each other across said gap with a rotary motion and having the capability to generate an aural snap at a time of opening/closing the folder;
   wherein a second gar) (g1) is arranged between the outer face of the second cam and the inner face of the cam cover; and
   wherein the first gap (g2) is smaller than the second gap (g1) thereby enabling the capability to generate an aural snap at the time of opening/closing the folder.

2. The snap hinge device as claimed in claim 1, wherein said at least one flat surface of one end of the hinge shaft is formed with top and bottom rectangular flat faces, the second cam is fitted on the top and bottom flat faces and the first gap (g2) is arranged between the top and bottom flat faces and the inner face of the second cam.

3. A folding-type portable terminal comprising:
   a body;
   a folder; and
   a snap hinge device enabling the folder to be opened or closed in relation to the body;
   wherein the snap hinge device comprises:
      a hinge housing;
      a hinge shaft;
      an elastic member provided on the hinge shaft;
      a cam unit including first and second cams which are faced to each other, wherein the elastic member provides a force urging the first and second cams to come into close contact with each other by the elastic member thereby conducting cam action; and
      a cam cover coupled to the hinge housing to shield the cam unit from the outside of the hinge housing;
   wherein a first gap (g2) is formed between at least one flat surface of an outer face of the hinge shaft and an inner face of the second cam such that the force provided by the elastic member compels said at least one flat surface of the outer face of the hinge shaft and the inner face of the second cam to strike into each other across said gap with a rotary motion and having the capability to generate an aural snap at a time of opening/closing the folder;
   wherein a second gap (g1) is arranged between the outer face of the second cam and the inner face of the cam cover; and
   wherein the first gap (g2) is smaller than the second gap (g1) thereby enabling the capability to generate an aural snap at the time of opening/closing the folder.

* * * * *

UNITED STATES PATENT AND TRADEMARK OFFICE
CERTIFICATE OF CORRECTION

| | |
|---|---|
| PATENT NO. | : 8,424,163 B2 |
| APPLICATION NO. | : 13/212505 |
| DATED | : April 23, 2013 |
| INVENTOR(S) | : Sung-Ho Ahn |

It is certified that error appears in the above-identified patent and that said Letters Patent is hereby corrected as shown below:

In the Claims

Column 5, Claim 1, Line 27 should read as follows:
--…wherein a second gap (g1) is arranged…--

Signed and Sealed this
Eleventh Day of June, 2013

Teresa Stanek Rea
*Acting Director of the United States Patent and Trademark Office*